(12) United States Patent
Tobey et al.

(10) Patent No.: US 7,738,192 B1
(45) Date of Patent: Jun. 15, 2010

(54) ILLUMINATED OPTICAL APPARATUS

(75) Inventors: W. Scott Tobey, Downers Grove, IL (US); Jeffrey J. Blanco, Oglesby, IL (US); Dwayne D. Forsyth, Deer Park, IL (US); Steven Devick, Downers Grove, IL (US)

(73) Assignee: S. J. Technologies, LLC, Oglesby, IL (US)

( * ) Notice: Subject to any disclaimer, the term of this patent is extended or adjusted under 35 U.S.C. 154(b) by 0 days.

(21) Appl. No.: 12/650,280

(22) Filed: Dec. 30, 2009

Related U.S. Application Data

(60) Provisional application No. 61/141,474, filed on Dec. 30, 2008.

(51) Int. Cl.
*G02B 27/02* (2006.01)
(52) U.S. Cl. ...................................... 359/802; 362/276
(58) Field of Classification Search ................. 359/802; 362/276
See application file for complete search history.

(56) References Cited

U.S. PATENT DOCUMENTS

| | | | |
|---|---|---|---|
| 5,097,340 A | 3/1992 | Tanabe et al. | |
| 5,266,791 A | 11/1993 | Morizumi | |
| 5,687,400 A | 11/1997 | Ishiguro et al. | |
| 7,048,406 B1 | 5/2006 | Shih | |
| 7,154,112 B2 | 12/2006 | Eubelen | |
| 2008/0192364 A1* | 8/2008 | Schuttinger | 359/802 |

* cited by examiner

*Primary Examiner*—Joseph Martinez
(74) *Attorney, Agent, or Firm*—Scott E. Kamholz; Foley Hoag LLP

(57) ABSTRACT

A device may include a magnifying lens having a focal length that defines a focal plane, a light source providing visible light directed toward the focal plane, and a controller. The controller may be programmed to receive a signal indicative of the distance from the device to an object, cause the light source to emit visible light at a first brightness if the distance is at least substantially equal to the focal length of the lens, and cause the light source to emit visible light at a second brightness, dimmer than the first brightness, if the distance is not at least substantially equal to the focal length of the lens.

20 Claims, 6 Drawing Sheets

ILLUMINATED OPTICAL APPARATUS

CROSS-REFERENCE TO RELATED APPLICATION

This application claims the benefit of U.S. provisional application Ser. No. 61/141,474, filed Dec. 30, 2008, which is hereby incorporated herein by reference.

SUMMARY

A lighted magnifier may be programmed to give feedback to a user about whether a target the user is attempting to view with the magnifier is positioned at the magnifying lens's focal length. For example, the magnifier can illuminate a target with full brightness only when the target is brought to or near the focal distance of the magnifying lens, and to dim or turn off the illumination when the target is not in the vicinity of the focal distance. The magnifier thus provides both illumination and feedback to train a user to position the object properly with respect to the lens.

DETAILED DESCRIPTION

Figure 1:
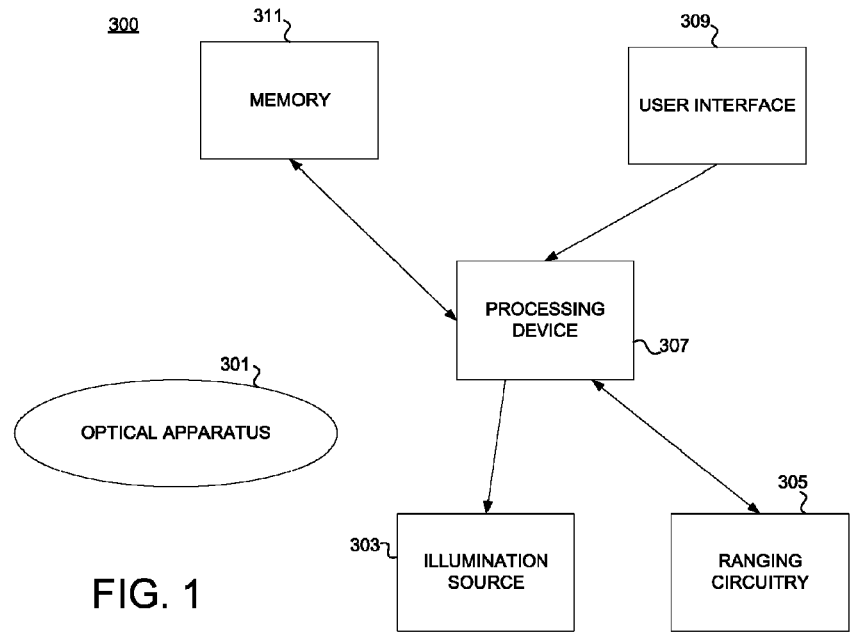
FIGS. 1-2 are schematic diagrams of a lighted magnifier.

Like a number of prior-art devices, an automatic lighted magnifier as presently disclosed includes a magnifying lens and a light source that shines light on the target to be viewed. But it also includes a controller that receives a signal and gives feedback to the user based on that signal. The signal is indicative of the distance from the device to an object, and the feedback is indicative of whether the distance is in the lens's range of focus. In the present context, the distance is considered to be in the lens's range of focus if it is within 10% of the lens's focal length (i.e., no closer than 90% of the focal length and no further than 110% of the focal length).

Such feedback is useful for training and the use of magnifying devices since it lets the user know what the appropriate working distance to the object of regard should be. The feedback can be especially useful in situations in which a user requires training in the proper working distance for the magnifier. While positioning a target at a distance other than the lens's focal length will result in a blurry image, the blurriness can be subtle and difficult for some users to detect. Yet even the slight blurriness can cause fatigue and difficulty. The inventors realized that the magnifier could be programmed to provide feedback that is more immediately and easily detectable than mere blurriness and thereby facilitate the user's familiarization with the proper working distance.

An especially convenient form of feedback is the illumination light level. The controller may be programmed to turn on the illumination light source (or bring it up to full power from a dimmed state) only when the target is positioned in the lens's range of focus, or at or near (i.e., at a distance at least substantially equal to) the focal length of the magnifier lens. The controller receives a signal indicative of the position of the distance from the magnifier device to the target and controls the light source based on that signal.

The signal may include, for example, numerical data that represents the distance, and the controller compares that measurement to a preset focal length value. The signal may include numerical data that represents a difference or a ratio (such as a percentage) between the focal length and the distance. The signal may include Boolean data (i.e., yes/no or on/off) indicating whether the distance is in the range of focus, or at least substantially equal to the focal length of the lens.

The signal may be produced by a sensor. The sensor may be, for example, an infrared light source and detector that are angled and positioned on the device such that emitted sensor light bounces off the target and into the detector only when the target is at the lens's focal length. Thus the light source will illuminate (or brighten) automatically when the magnifier is correctly positioned for viewing relative to the target. The controller will stop (or dim) the illumination when the signal indicates that there is no target at or near the focal distance.

The controller may be programmed to keep the illumination light source turned on throughout the usable range of the lens even after the target moves away from the exact focal length and/or its vicinity (that is, the illumination will turn on only at or near the focal length but can stay on throughout a range of distances around the exact focal distance). This "buffer" may be implemented in a variety of ways, including time-based and distance-based. In a time-based implementation, the controller may include a timer that keeps the illumination briefly turned on even if the user drifts out of the usable range, to provide illumination continuity until the user gets back into range. A timer may be especially useful when the signal is simply a Boolean indicator of whether the target distance matches the focal length. But the controller will still turn off (or dim) the illumination if the user does not get back into range within the timer's limit. Alternatively, in a distance-based implementation of the buffer, the sensor may be designed to report any distance that is in the range of focus, or at least substantially equal to the focal length, as being equal to the focal length. The controller will then maintain the illumination even when the distance is outside the range of focus, or unequal to the focal length but still at least substantially equal to the focal length. In another alternative, the sensor is programmed to sample the distance as it varies over time, and the signal produced is indicative of time-averaged distance. Excursions away from the focal length are thereby filtered out until they shift the average distance outside the acceptable limit.

In addition to the conventional utility of providing illumination for a target, the present magnifiers also provide the user with positioning feedback: with a magnifier using illumination-based feedback, the user gets the best illumination when the target is positioned at the best distance. The user thereby can learn to position the target at the lens's focal length.

The device may employ various forms of illuminating light, such as visible light, ultraviolet light, or infrared light, as well as combinations of these and other portions of the electromagnetic spectrum. Visible light may be white light or may be made up of various sub-bands of visible light, such as red, green, and/or blue light.

While the embodiments described herein use the brightness of the illuminating light as the principal medium for feedback, other feedback modalities are possible. For example, the light could flash when out of range and become steady when in range. The illuminating light could be directed away from the lens's center of focus when out of range and toward the center when in range. The device could emit a sound, vibration, heat, or light (such as an icon on the device) depending on whether the target is in range. The device could emit tinted light when out of range and white light when in range. The device could alternate between white light and tinted light when out of range and become steady white light when in range. The tint of the light can vary based on positional error: the tint can fade as the focal length is neared and intensify as it is left; or the tint can change color, such as red when the distance is too close and blue when too far.

FIG. 1 shows block diagram 300 of apparatus 100 that magnifies and illuminates a target. The user views the target through lens 301 so that the target is illuminated by illumination source 303 when ranging circuit 305 determines that the target is at a desired distance (typically a predetermined value and equal to the focal distance of lens 301) when activated by a user through user interface 309 (such as a switch).

Processing device 307 obtains an indication from ranging circuit 305 when the target is located at the desired distance and activates illumination source 303 in accordance with process 200.

Processing device 307 may execute computer executable instructions from a computer-readable medium, e.g., memory 311. Computer storage media may include volatile and nonvolatile, removable and non-removable media implemented in any method or technology for storage of information such as computer readable instructions, data structures, program modules or other data. Computer storage media include, but is not limited to, random access memory (RAM), read only memory (ROM), electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by processing device 307.

Figure 2:
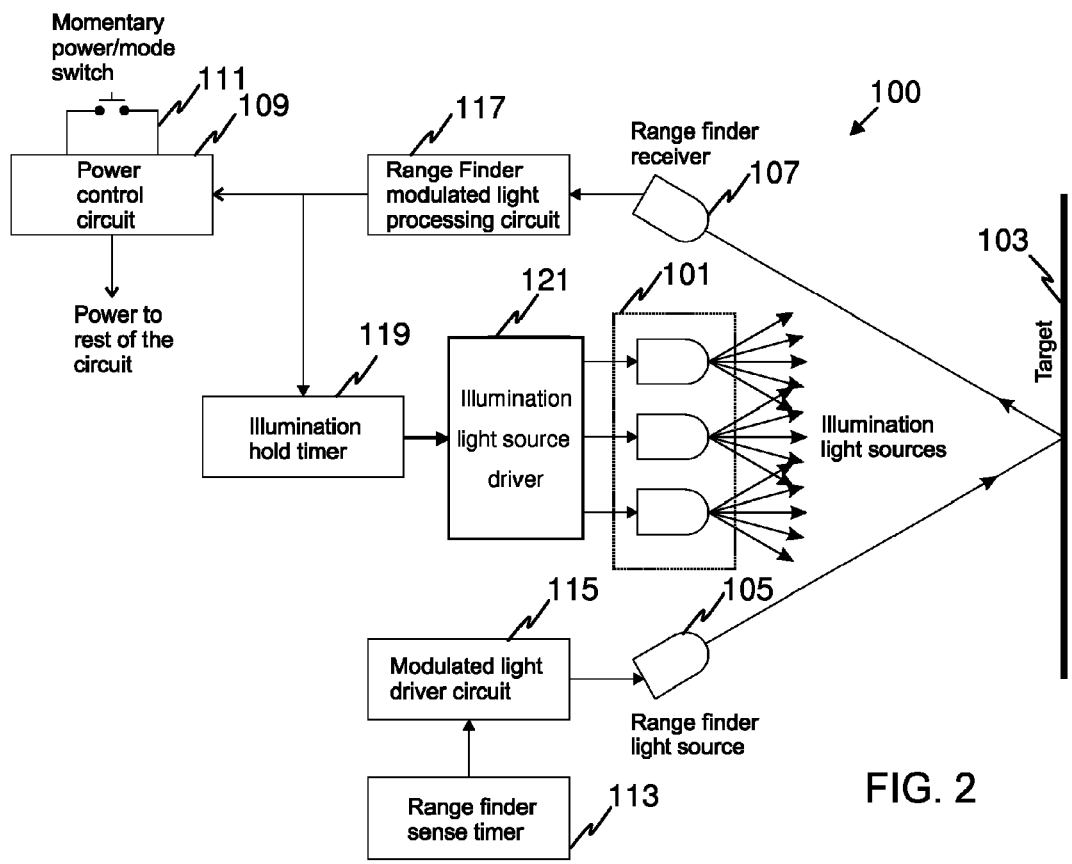

FIG. 2 schematically shows the arrangement of an apparatus 100 that magnifies and illuminates target 103. The apparatus may be employed on or in spectacle frames, handheld magnifiers, magnifier stands, and the like. The apparatus includes sensor components 105 and 107 which trigger LEDs (illumination source) 101 to illuminate reading material, or any other object to be viewed when that object is brought to within the focal distance of a lens (not shown).

Apparatus 100 not only provides for the light necessary for seeing, it also allows a user to know exactly where the user should be holding the reading material for the best optical focus. This capability may be important with low vision when dealing with higher powered lenses that require shorter working distances.

Apparatus 100 operates on the premise that the object (target) is in focus at the focal point of the lens.

Apparatus 100 includes a lens system (not shown in FIG. 2 but shown in FIGS. 6-9), an illuminator, a sensor, and mounts for those components. Apparatus 100 magnifies and activates an illuminator at the focal point of the magnifier, thus providing illumination and a positive feedback to the user that the magnifier is being used properly.

Upon energizing the momentary power switch 111, the power control circuit 109 is activated. A function of power control circuit 109 is to provide power to the rest of the circuitry of apparatus 100 and to turn off the power when apparatus 100 is no longer being used. The power control circuit 109 utilizes a timer to keep power on after the momentary power switch 111 is activated. This timer is reset by feedback from range finder modulated light processing circuit 117. As long as apparatus 100 is sensing target 103, the power will stay on, and for a short time thereafter, as determined by the timer in power control circuit 109. This approach saves electrical power while providing convenience to the user.

When apparatus 100 is initialized, range finder sense timer 113 sends a signal to the modulated light driver circuit 115 triggering a series of pulses to range finder source 105. A function of range finder sense timer 113 is to conserve power. Range finder light source 105 does not have to operate continuously; an intermittent test of the distance to the target is adequate. The modulated light driver circuit 115 provides a series of pulses to the range finder light source 105; for example, a signal may be transmitted with a modulation frequency of 38 kHz in 10 msec. bursts every 100 msec. These pulses have a short "on" duty cycle, thus conserving electrical power.

The ranging distance to target 103 may be determined by the triangulation method. Both the range finder light source 105 and the field of view of the range finder receiver 107 intersect at target 103. This intersection may be set by way of adjustment screws and calibrated at a determined distance in front of and behind the focal point of the magnifier, providing a clear image within the range of focus to the viewer. When target 103 is moved into the intersection point of range finder light source 105 and ranger finder receiver 107, the reflected modulated light becomes intense enough to trigger the output of range finder modulated light processing circuit 117. Range finder modulated light processing circuit 117 is only sensitive to the modulated light emitted by the range finder source 105, therefore reducing interference from other light sources, including illumination light source 101. This action in turn starts illumination hold timer 119. Illumination hold timer 119 keeps illumination light source 101 in the "on" state should target 101 be moved out of the intersection point for a short period of time. The output of the illumination hold timer 119 signals the illumination light source driver 121 to turn on the "illumination light source 101, thus illuminating target 103.

A function of the sensor 117 is to activate (turn on) illumination source 101 when an object (target 103) to be viewed is at or near the focal length of the lens system or through the range of focus of the lens. Various methods of range finding can be employed. These include but are not limited to a triangulation method, strength of reflected signal method, or timing of the signal reflected back from the object (time of flight measurement.) Other methods could be employed to sense the focal distance such as utilizing an algorithm to analyze the image as projected onto an image sensor array, a linear image sensor, interferometer, or phase shift method. The above sensing methods could utilize infrared light, visible light, solid state laser or sound waves.

As shown in FIGS. 6-9, illumination light source 101 and range finder light source do not typically illuminate through the lens (though they may) but rather around the periphery of the lens.

Power conservation may be enhanced in a variety of ways. Range finder sense timer 113, the short duty cycle modulated pulses provided by the modulated light driver circuit 115, and the use of momentary power switch 111 contribute to conserving electrical power. Apparatus 100 is typically powered by replaceable or rechargeable batteries and so benefits from reductions in power consumption. In cases where electrical power is provided by an external source, e.g., standard wall current, AC adapter, or wall mounted power supply, power saving techniques may be less important or desirable. The device can adjust the logic that the controller uses depending on the power source.

The range finder source 105 and range finder receiver 107 may include, respectively, a spectrally matched infrared (IR) LED and IR filtered phototransistor receiver with a peak sensitivity in the IR range (such as 940 nm). IR-based rangefinding offers several benefits. First, the IR LED is invisible to human eye and thus is not distracting the user. In addition the IR LED and IR filtered receiver provide an extra measure of resistance to false triggering from high ambient light conditions. Additionally, the spectrally matched pair provide excellent optical coupling and thus reduce the required power to operate.

A variety of light emitting devices may be used for illumination light source 101 based on the applicability in different applications. However, a light source providing high intensity mildly diffused white light is typically preferable. In cases where the user suffers from various eye diseases, a colored light source may be preferable to enhance the contrast of the target image. Generally, a high efficiency LED would be the preferred light source, but in some cases electroluminescent or OLEDs may be a better choice based on the intended use.

The illuminator can be of various light frequencies, either monochromatic or broad spectrum as required, and may be selected to specifically aid or enhance vision in a low vision patient. The light can be generated by one or more methods, including but not limited to LED, incandescent, fluorescent, OLED, or electroluminescent. Various methods of conveying or focusing the light can be employed including but not limited to lens optics, fiber optics, mirrors, reflective surfaces or light conductive materials. The light may or may not be diffused depending on its intended use.

The lens system can consist of a single lens, as in but not limited to, a hand magnifier or stand magnifier; or two lenses as in a pair of spectacles. Several individual lenses may be used together to make up a lens system. The lens system is typically fixed—i.e., not adjustable. The fixed lens system therefore has a fixed (i.e., nonadjustable) focal length, and the controller and sensor are arranged to act based on that focal distance. Alternatively, the device may include a lens system that allows for adjustment (typically by allowing relative motion between the lenses), in which case the controller and sensor accommodate the adjustability.

The mount may include a spectacle frame, a stand, trial frame or a hand held device.

Figure 3:
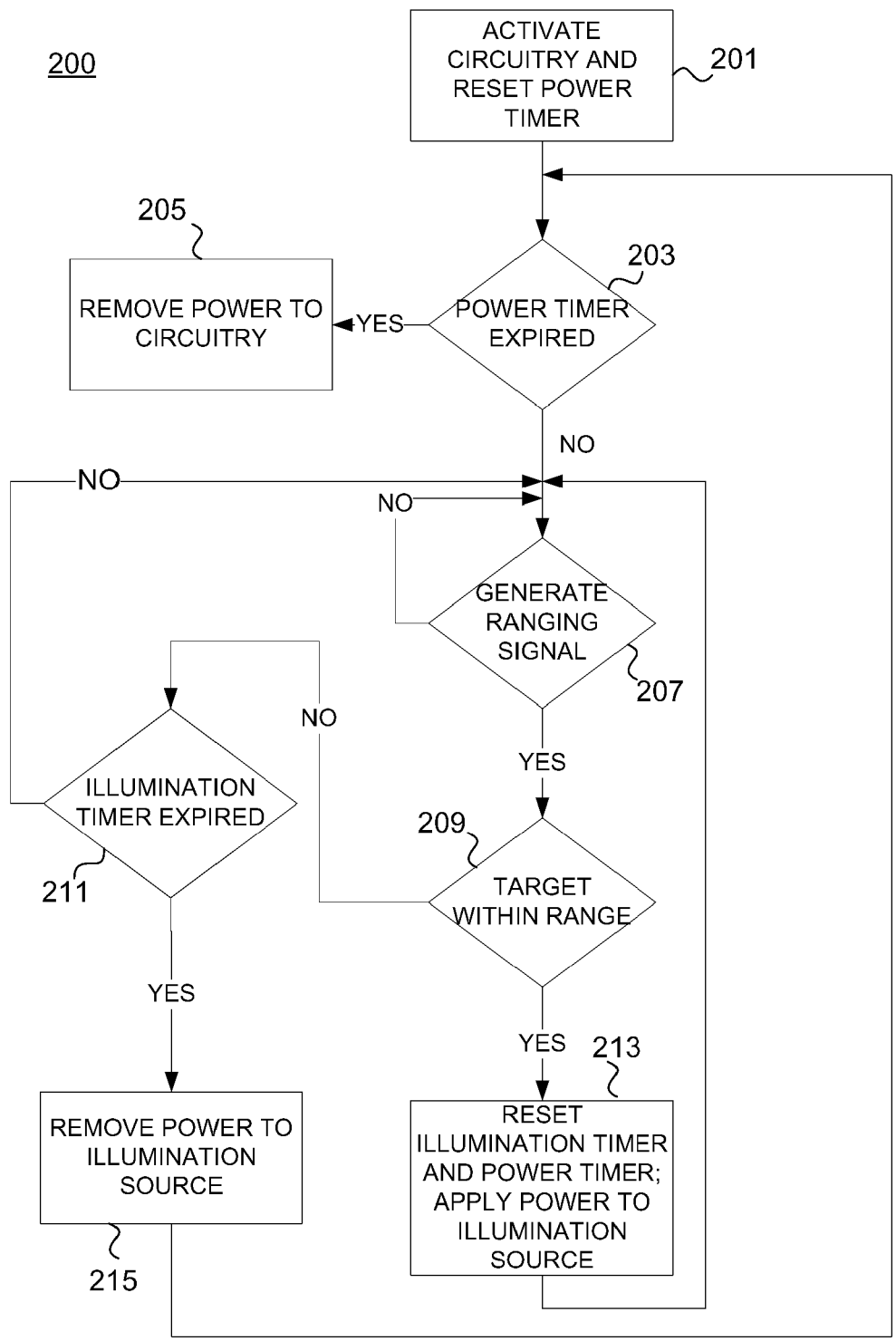
FIGS. 3-5 are flow diagrams showing various embodiments of controller programming for lighted magnifiers.
Figure 4:
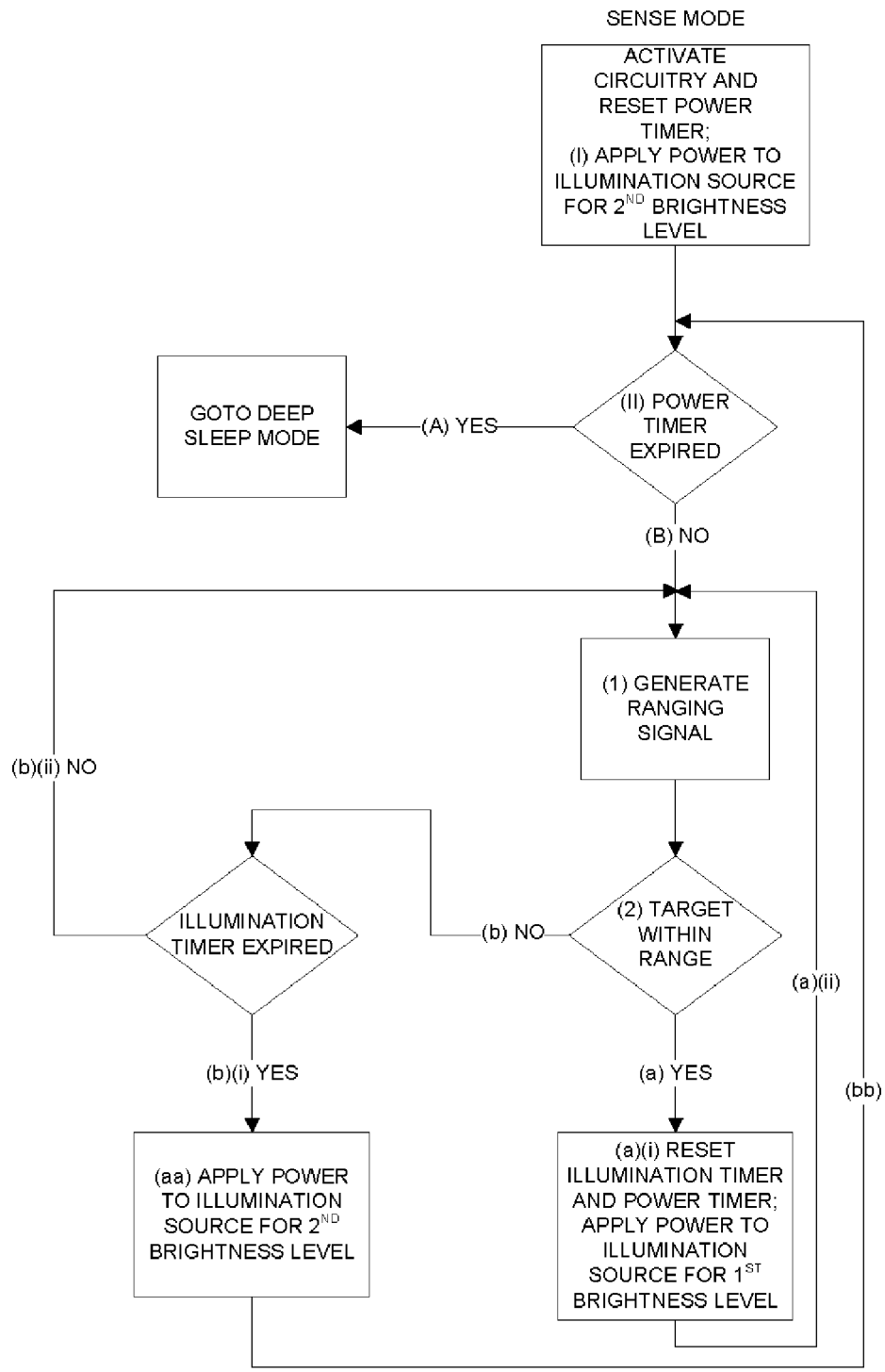
Figure 5:
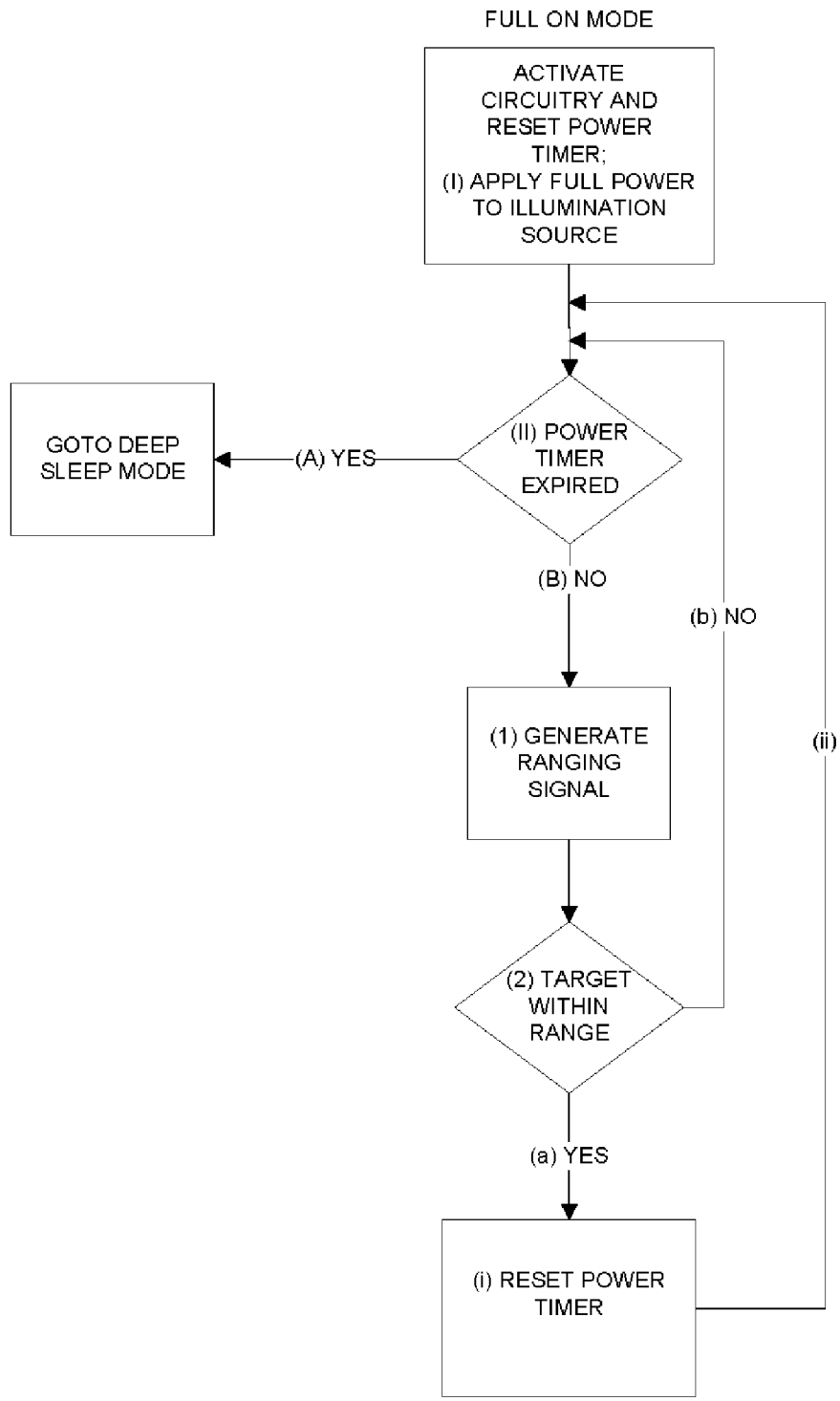

FIGS. 3-5 show flow diagrams for magnifier controllers. As shown in FIG. 3, in step 201, circuitry of apparatus 100 is activated and the power timer (typically located in power control circuit 109) is reset when a user depresses switch 111 as shown in FIG. 1. Step 203 determines if the power timer has expired. If so, electrical power is removed from the circuitry of apparatus 100 in step 205.

Step 207 determines whether to generate a ranging signal through range finder source 105 based on range finder sense timer 113. Step 209 determines whether the target is at the desired distance (typically the focal distance of the lens). If so, illumination hold timer 119 is reset in step 213 so that illumination light source 101 illuminates target 103.

If target 103 is not within the desired distance, step 211 determines whether illumination hold timer 119 has expired. If so, illumination light source 101 terminates illuminating target 103.

FIG. 4 shows a flow diagram similar to that in FIG. 3. It is generalized to accommodate for two brightness levels, as opposed to simply on or off. The first brightness level is typically full brightness, while the second brightness level is dimmer than the first brightness level. The second brightness level may be, for example, 0% to about 90%, about 10% to about 80%, about 20% to about 70%, about 30% to about 60%, about 40% to about 50%, about 10%, about 20%, about 30%, about 40%, about 50%, about 60%, about 70%, about 80%, and/or about 90% of full brightness. The controller includes a power timer and an illumination timer, and it is programmed to cause the light source to emit light at the first brightness if the illumination timer is not expired, even if the distance is outside the range of focus, or not at least substantially equal to the focal length; cause the light source to emit light at the second brightness if the illumination timer is expired and the distance is outside the range of focus, or not at least substantially equal to the focal length; and cause the light source to switch from the second brightness to emitting no light if the illumination timer is expired and the power timer is expired. The illumination timer thus provides a buffer for users who have some difficulty maintaining the target at the appropriate distance; the illumination timer will maintain the light source at the first brightness, even if the controller is no longer receiving a signal indicating that the target is at the focal length, for the duration of the illumination timer. After the illumination timer expires, the light will be switched to the second brightness, thereby alerting the user to the drift from the focal length. If the target is not restored to the focal length before the power timer expires, the device will be placed in a sleep mode, i.e., no power to the illumination light source.

After the circuitry is activated and the power timer is reset, flow proceeds as follows:

(I) cause the light source to emit light at the second brightness;
(II) determine whether the power timer is expired, and:
  (A) if the power timer is expired, then to cause the light source to emit no light; or
  (B) if the power timer is not expired, then to:
    (1) cause the sensor to measure the distance;
    (2) determine whether the distance is in the range of focus or at least substantially equal to the focal length, and:
      (a) if the distance is in the range of focus or at least substantially equal to the focal length, then to:
        (i) reset the power timer and the illumination timer and cause the light source to emit power at the first brightness; and
        (ii) repeat from step (1); or
      (b) if the distance is not in the range of focus or at least substantially equal to the focal length, then to determine whether the illumination timer is expired, and:
        (i) if the illumination timer is expired, then to:
          (aa) cause the light source to emit light at the second brightness; and
          (bb) repeat from step (II) without first resetting the power timer; or
        (ii) if the illumination timer is not expired, then to repeat from step (1) without first resetting the illumination timer.

FIG. 5 shows a flow diagram for a simplified scheme that omits the illumination timer. The controller includes a power timer. The second brightness is zero brightness, and the controller is programmed to cause the light source to emit light if the power timer is not expired; and cause the light source to emit no light if the power timer is expired. After the circuitry is activated and the power timer is reset, flow proceeds as follows:

(I) cause the light source to emit light at the first brightness;
(II) determine whether the power timer is expired, and:
  (A) if the power timer is expired, then to cause the light source to emit no light; or
  (B) if the power timer is not expired, then to:
    (1) cause the sensor to measure the distance;
    (2) determine whether the distance is in the range of focus or at least substantially equal to the focal length, and:
      (a) if the distance is in the range of focus or at least substantially equal to the focal length, then to:

(i) reset the power timer; and
(ii) repeat from step (II); or
(b) if the distance is not in the range of focus or at least substantially equal to the focal length, then to repeat from step (II) without first resetting the power timer.

A transition between full illumination and no illumination, or even between full illumination and partial illumination, can be jarring to a user. Consequently, the controller may be programmed to cause the light source emission level to transition gradually between the first brightness to the second brightness as the distance moves out of the range of focus or changes between at least substantially equal to the focal length to not at least substantially equal to the focal length.

The various brightness levels may be achieved in a variety of ways. For example, as shown in FIG. 4, the power level to the illumination source may be raised or lowered, thereby causing the illumination source to emit higher or lower amounts of light. Alternatively, the light source may include multiple discrete light emitters, of which all are turned on to provide full brightness, and of which fewer than all are turned on to provide light at dimmer levels.

Figure 6:
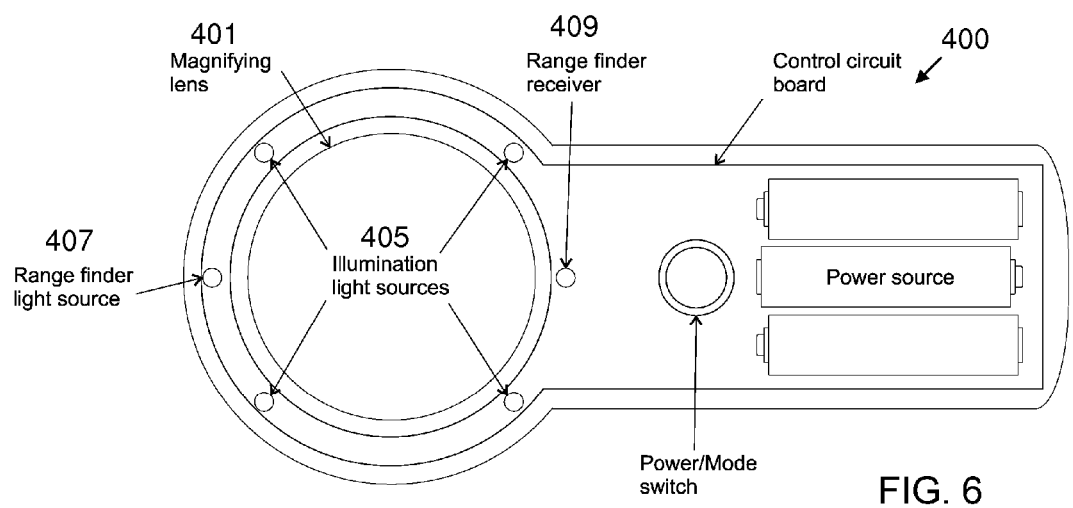
FIGS. 6-9 illustrate embodiments of a lighted magnifier.
Figure 7:
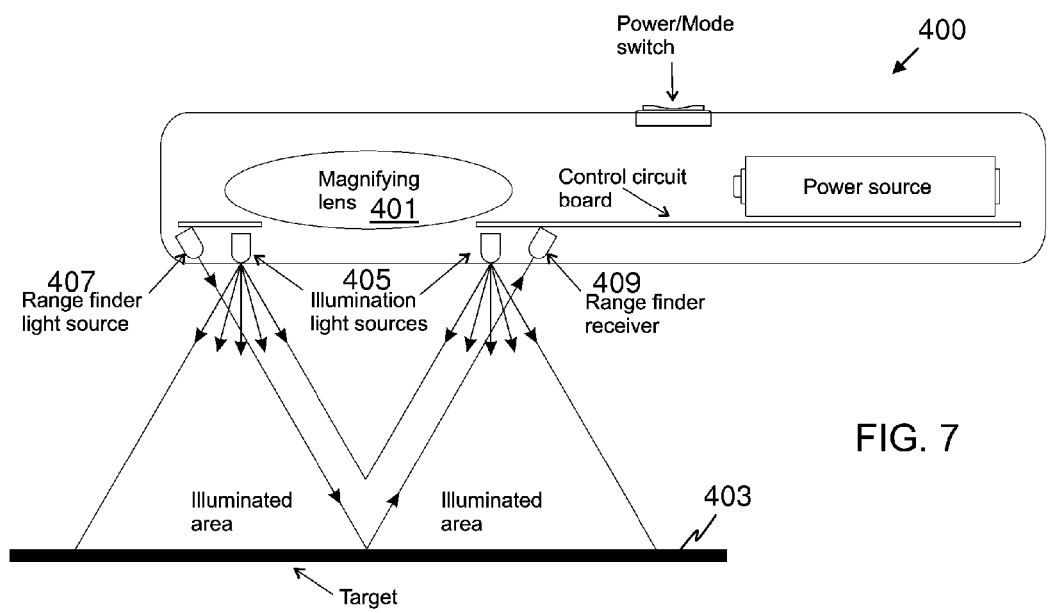

FIGS. 6-7 show magnifying apparatus 400 in the form of a handheld viewer. The user views target 403 through lens 401. Target 403 is illuminated by illumination sources 405 when the range finder determines that target 403 is at the focal distance of lens 401, based on the ranging signal transmitted by range finder light source 407 and received by range receiver 409.

Figure 8:
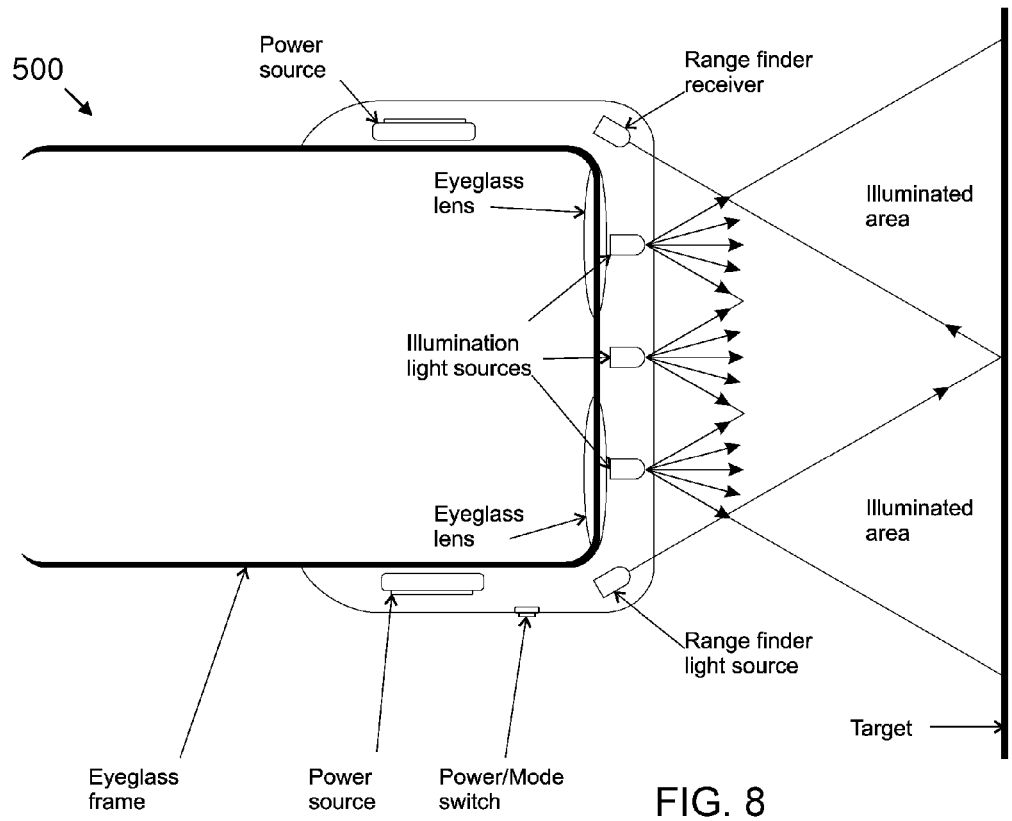
Figure 9:
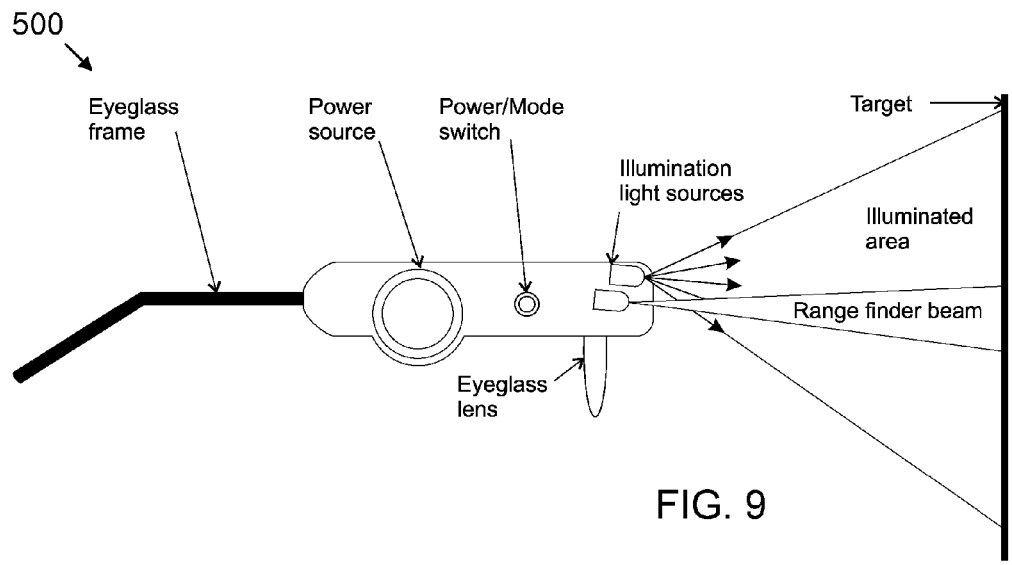

FIGS. 8-9 show magnifying apparatus 500 in the form of eyeglasses. Apparatus 500 operates in a similar manner as apparatus 400.

As noted previously, a basic premise of focal light magnifiers is that the object (target) is illuminated at the focal point of the lens. In embodiments using illuminating light as the feedback medium, magnifier illumination is triggered by sensors which automatically turn the light on at the focal point of the lens. Stand magnifier illumination may be configured so that the target is at the focal point of the lens when making contact with the stand. By having the object of regard at the focal point of the lens, light emitted from the lens is parallel requiring no accommodation, reading lenses, or bifocals. Alternatively, if a user prefers to use the magnifier while wearing reading glasses or bifocals, or while not wearing distance-prescription glasses, the magnifier lens may incorporate an appropriate near-point correction for the user.

As can be appreciated by one skilled in the art, a computer system with an associated computer-readable medium containing instructions for controlling the computer system can be utilized to implement the exemplary embodiments that are disclosed herein. The computer system may include at least one computer such as a microprocessor, digital signal processor, and associated peripheral electronic circuitry.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim:

1. A device comprising:
    a magnifying lens having a fixed, non-adjustable focal length that defines a focal plane and a range of focus;
    a light source providing visible light directed toward the focal plane; and
    a controller programmed to:
        receive a signal indicative of the distance from the device to an object;
        cause the light source to emit visible light at a first brightness if the distance is in the lens's range of focus; and
        cause the light source to emit visible light at a second brightness, dimmer than the first brightness, if the distance is not in the lens's range of focus.

2. The device of claim 1, wherein the signal comprises numerical data that represents the distance.

3. The device of claim 1, wherein the signal comprises numerical data that represents a difference between the focal length and the distance.

4. The device of claim 1, wherein the signal comprises Boolean data indicating whether the distance is in the lens's range of focus.

5. The device of claim 1, wherein the second brightness is about 30% to about 60% of the first brightness.

6. The device of claim 1, wherein the second brightness is zero brightness, and the light source emits no light when the distance is not in the lens's range of focus.

7. The device of claim 1, wherein the controller is programmed to cause the light source emission level to transition gradually between the first brightness to the second brightness as the distance moves out of the lens's range of focus.

8. The device of claim 1, further comprising a sensor that measures the distance from the device to the object and produces the signal indicative of the distance from the device to the object.

9. The device of claim 8, wherein the sensor comprises a transmitter and a receiver that are arranged on the device to measure the distance by triangulation.

10. The device of claim 9, wherein the transmitter comprises a light emitter and the receiver comprises a light detector.

11. The device of claim 10, wherein the light emitter emits infrared light, and the receiver is sensitive to infrared light.

12. The device of claim 8, wherein the sensor comprises an image sensor.

13. The device of claim 12, wherein the sensor comprises a linear image sensor.

14. The device of claim 8, wherein the sensor is programmed to sample the distance as it varies over time, and the signal produced is indicative of time-averaged distance.

15. The device of claim 8, further comprising a power timer, and wherein the second brightness is zero brightness, and wherein the controller is programmed to:
    cause the light source to emit light if the power timer is not expired; and
    cause the light source to emit no light if the power timer is expired.

16. The device of claim 15, wherein the controller is programmed to:
    (I) cause the light source to emit light at the first brightness;
    (II) determine whether the power timer is expired, and:
        (A) if the power timer is expired, then to cause the light source to emit no light; or
        (B) if the power timer is not expired, then to:
            (1) cause the sensor to measure the distance;
            (2) determine whether the distance is in the lens's range of focus, and:
                (a) if the distance is in the lens's range of focus, then to:
                    (i) reset the power timer; and
                    (ii) repeat from step (II); or (b) if the distance is not in the lens's range of focus, then to repeat from step (II) without first resetting the power timer.

17. The device of claim 8, further comprising a power timer and an illumination timer, and wherein the controller is programmed to:
cause the light source to emit light at the first brightness if the illumination timer is not expired, even if the distance is not in the lens's range of focus;
cause the light source to emit light at the second brightness if the illumination timer is expired and the distance is not in the lens's range of focus; and
cause the light source to switch from the second brightness to emitting no light if the illumination timer is expired and the power timer is expired.

18. The device of claim 17, wherein the controller is programmed to:
(I) cause the light source to emit light at the second brightness;
(II) determine whether the power timer is expired, and:
(A) if the power timer is expired, then to cause the light source to emit no light; or
(B) if the power timer is not expired, then to:
(1) cause the sensor to measure the distance;
(2) determine whether the distance is in the lens's range of focus, and:
(a) if the distance is in the lens's range of focus, then to:
(i) reset the power timer and the illumination timer and cause the light source to emit power at the first brightness; and
(ii) repeat from step (1); or
(b) if the distance is not in the lens's range of focus, then to determine whether the illumination timer is expired, and:
(i) if the illumination timer is expired, then to:
(aa) cause the light source to emit light at the second brightness; and
(bb) repeat from step (II) without first resetting the power timer; or
(ii) if the illumination timer is not expired, then to repeat from step (1) without first resetting the illumination timer.

19. The device of claim 1, wherein:
the light source comprises multiple light emitters;
all emitters are turned on to provide light at the first brightness; and
fewer than all emitters are turned on to provide light at the second brightness.

20. A method comprising:
sensing a distance from the device of claim 1 to an object; and
issuing feedback, perceptible to a user of the device, that is indicative of whether the distance is in the lens's range of focus, the feedback comprising:
emitting light at the first brightness if the distance is in the lens's range of focus; and
emitting light at the second brightness, dimmer than the first brightness, if the distance is not in the lens's range of focus.

* * * * *

UNITED STATES PATENT AND TRADEMARK OFFICE
CERTIFICATE OF CORRECTION

PATENT NO. : 7,738,192 B1  Page 1 of 1
APPLICATION NO. : 12/650280
DATED : June 15, 2010
INVENTOR(S) : W. S. Tobey et al.

It is certified that error appears in the above-identified patent and that said Letters Patent is hereby corrected as shown below:

Col. 5, line 22, replace "minors" with --mirrors--.

Signed and Sealed this

Third Day of August, 2010

David J. Kappos
*Director of the United States Patent and Trademark Office*